US011285937B2

(12) United States Patent
Higuchi et al.

(10) Patent No.: US 11,285,937 B2
(45) Date of Patent: Mar. 29, 2022

(54) CATALYST WARM-UP CONTROL METHOD FOR HYBRID VEHICLE AND CATALYST WARM-UP CONTROL APPARATUS FOR HYBRID VEHICLE

(71) Applicant: Nissan Motor Co., Ltd., Yokohama (JP)

(72) Inventors: Shinsuke Higuchi, Kanagawa (JP); Hidekatsu Akiyama, Kanagawa (JP); Azusa Kobayashi, Kanagawa (JP); Keisuke Kawai, Kanagawa (JP); Takashi Kamijo, Kanagawa (JP); Tsuyoshi Ishikawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 46 days.

(21) Appl. No.: 16/772,587

(22) PCT Filed: Dec. 15, 2017

(86) PCT No.: PCT/JP2017/045224
§ 371 (c)(1),
(2) Date: Jun. 12, 2020

(87) PCT Pub. No.: WO2019/116589
PCT Pub. Date: Jun. 20, 2019

(65) Prior Publication Data
US 2020/0398819 A1 Dec. 24, 2020

(51) Int. Cl.
B60W 20/16 (2016.01)
B60W 10/06 (2006.01)
(Continued)

(52) U.S. Cl.
CPC ............ B60W 20/16 (2016.01); B60W 10/06 (2013.01); B60W 10/08 (2013.01); B60W 10/24 (2013.01);
(Continued)

(58) Field of Classification Search
CPC ...... B60W 20/16; B60W 10/06; B60W 10/08; B60W 10/24; B60W 2520/00;
(Continued)

(56) References Cited

U.S. PATENT DOCUMENTS 6,311,666 B1 * 11/2001 Rubbert .............. F02D 41/0245
123/295
6,427,793 B1 * 8/2002 Hanada .................... B60K 6/48
180/65.25
(Continued)

FOREIGN PATENT DOCUMENTS

JP H11-82093 A 3/1999
JP 2001132491 A 5/2001
(Continued)

Primary Examiner — Sizo B Vilakazi
Assistant Examiner — Brian R Kirby
(74) Attorney, Agent, or Firm — Young Basile Hanlon & MacFarlane, P.C.

(57) ABSTRACT

A catalyst warm-up control method for a hybrid vehicle supplies electric power to an electric motor by a battery, to charge the battery by a power generation engine, and to treat exhaust gas from the engine with a catalyst, the hybrid vehicle selecting a manner mode in which power generation using the engine is stopped. The catalyst warm-up control method performs catalyst warm-up control such that when the temperature of the catalyst becomes lower than a normal threshold temperature for activating the catalyst, the target rotation speed of the engine is controlled to a first warm-up required rotation speed at which the catalyst can be heated to a temperature that is higher than the normal threshold temperature. When the manner mode is selected, control is (Continued)

performed when temperature of the catalyst becomes lower than a manner mode threshold temperature that is equal to or less than the normal threshold temperature.

8 Claims, 11 Drawing Sheets

(51) Int. Cl.
 *B60W 10/08* (2006.01)
 *B60W 10/24* (2006.01)
 *F02D 41/02* (2006.01)
(52) U.S. Cl.
 CPC ..... *F02D 41/0255* (2013.01); *B60W 2520/00* (2013.01); *F02D 2200/0802* (2013.01)
(58) Field of Classification Search
 CPC ... B60W 2510/244; B60W 2710/0666; B60W 2710/081; B60W 2520/10; B60W 20/13; B60W 2510/0638; F02D 41/0255; F02D 2200/0802; Y02T 10/40; Y02T 10/62; B60K 6/46; B60Y 2200/92
 USPC .......................................................... 701/22
 See application file for complete search history.

(56) References Cited

U.S. PATENT DOCUMENTS

| | | | |
|---|---|---|---|
| 6,470,985 | B1 | 10/2002 | Inada et al. |
| 6,745,117 | B1* | 6/2004 | Thacher ................. B60L 58/12 701/50 |
| 7,007,464 | B1 | 3/2006 | Asami et al. |
| 8,983,699 | B2* | 3/2015 | Nawata .................. B60K 6/445 701/22 |
| 2003/0070423 | A1* | 4/2003 | Morinaga ........... F01N 13/0093 60/284 |
| 2004/0163378 | A1* | 8/2004 | Sasaki ................. F02D 41/3076 60/284 |
| 2005/0034451 | A1* | 2/2005 | Miyashita ............. F01N 3/2006 60/300 |
| 2006/0016177 | A1* | 1/2006 | Tsutsumoto ............ F01N 3/023 60/295 |
| 2006/0173593 | A1* | 8/2006 | Anderson ............. B60W 20/15 701/36 |
| 2007/0144145 | A1* | 6/2007 | Takatsuto ............ F02D 41/0255 60/277 |
| 2008/0096717 | A1* | 4/2008 | Houle .................... B60K 6/442 477/5 |
| 2008/0157593 | A1* | 7/2008 | Bax ......................... B60L 58/10 307/10.1 |
| 2010/0044131 | A1* | 2/2010 | Teraya .................. B60W 10/08 180/65.265 |
| 2010/0058737 | A1* | 3/2010 | Harada ................. F02D 41/067 60/273 |
| 2010/0140001 | A1* | 6/2010 | Oe ......................... B60W 20/10 180/65.275 |
| 2014/0288736 | A1* | 9/2014 | Martin .................. B60W 20/00 701/22 |
| 2015/0314776 | A1* | 11/2015 | Yu ......................... B60W 20/40 701/22 |
| 2016/0052508 | A1* | 2/2016 | Teraya .................. B60W 10/06 701/22 |
| 2017/0292464 | A1 | 10/2017 | Hamamoto |
| 2018/0086334 | A1* | 3/2018 | Oguma ................... F02N 11/00 |

FOREIGN PATENT DOCUMENTS

| | | |
|---|---|---|
| JP | 2002-070542 A | 3/2002 |
| JP | 2010-047218 A | 3/2010 |
| JP | 2010069930 A | 4/2010 |
| JP | 2013-133040 A | 7/2013 |
| JP | 2016-8517 A | 1/2016 |
| JP | 2016-070071 A | 5/2016 |
| JP | 2017-128212 A | 7/2017 |

* cited by examiner

| ROTATION SPEED [rpm] | TORQUE [Nm] | CATALYST TEMPERATURE [degC] |
|---|---|---|
| 1200 | 21.3 | 549 |
| 1300 | 22.1 | 561 |
| 1500 | 25 | 586 |
| 1800 | 29.4 | 634 |
| 2000 | 33.2 | 667 |
| 2400 | 42.2 | 693 |
| 2650 | 25.3 | 699 |
| 2800 | 24.7 | 707 |
| 3050 | 24 | 738 |
| 3199 | 8.5 | 699 |
| 3200 | 3.5 | 672 |

FIG. 4

| VEHICLE SPEED [kph] | 0 | 10 | 15 | 18 | 50 | 70 | 90 | 110 |
|---|---|---|---|---|---|---|---|---|
| NORMAL THRESHOLD TEMPERATURE [degC] | 480 | 480 | 480 | 630 | 630 | 630 | 630 | 630 |
| MANNER MODE THRESHOLD TEMPERATURE [edgC] | 480 | 480 | 480 | 550 | 550 | 550 | 550 | 550 |
| WARM-UP REQUIRED ROTATION SPEED [rpm] | 1300 | 2000 | 2000 | 2000 | 2000 | 2000 | 2000 | 2000 |

FIG. 5

US 11,285,937 B2

CATALYST WARM-UP CONTROL METHOD FOR HYBRID VEHICLE AND CATALYST WARM-UP CONTROL APPARATUS FOR HYBRID VEHICLE

TECHNICAL FIELD

The present invention relates to a catalyst warm-up control method for a hybrid vehicle and a catalyst warm-up control apparatus for a hybrid vehicle.

BACKGROUND

In a hybrid vehicle, when an engine continues to stop, when motoring of the engine continues, or the like so that the temperature of a catalyst disposed in the exhaust system of the engine is lowered to cause a reduction in the exhaust gas purification performance, the engine is operated/combusted for catalyst warm-up to perform power generation (see JP2017-128212A).

On the other hand, there is a hybrid vehicle that installs a manner mode in which, in order to reduce noise, the power generation by an engine is stopped and an electric motor is driven by electric power of a battery, a charge mode in which the priority is given to the charge of the battery, and so on.

SUMMARY

However, there is a case in which the catalyst warm-up is started immediately after the manner mode is selected, thus giving a sense of incongruity to a driver. In particular, when the manner mode is selected after the SOC (State Of Charge: charge rate) of the battery is increased in the charge mode, there is a case in which the power generation using the engine is limited due to the SOC thus leading to insufficient catalyst warm-up so that the catalyst warm-up frequently occurs even during the manner mode, resulting in that a sense of incongruity given to the driver becomes marked.

It is therefore an object of the present invention to avoid the occurrence of catalyst warm-up immediately after selection of a manner mode in a hybrid vehicle.

A catalyst warm-up control method for a hybrid vehicle according to one embodiment of the present invention is a catalyst warm-up control method for a hybrid vehicle configured to supply electric power to an electric motor by a battery, to charge the battery by a power generation engine, and to treat exhaust gas discharged from the engine with a catalyst, the hybrid vehicle capable of selecting a manner mode in which power generation using the engine is stopped, wherein catalyst warm-up control is performed such that when a temperature of the catalyst becomes lower than a threshold temperature for activating the catalyst, a target rotation speed of the engine is controlled to a first warm-up required rotation speed at which the catalyst can be heated to a temperature higher than the threshold temperature, and when the manner mode is selected, the catalyst warm-up control is performed when the temperature of the catalyst becomes lower than a manner mode threshold temperature that is equal to or less than the threshold temperature.

BRIEF DESCRIPTION OF THE DRAWINGS

FIG. 4 is a diagram illustrating the relationship between the actual rotation speed of an engine and the catalyst temperature;
FIG. 5 is a diagram illustrating the set values of the normal threshold temperature, the manner mode threshold rotation speed, and the warm-up required temperature based on the vehicle speed.

DETAILED DESCRIPTION

An embodiment of the present invention will be described below with reference to the drawings.

[Configuration of Hybrid Vehicle]

Figure 1:
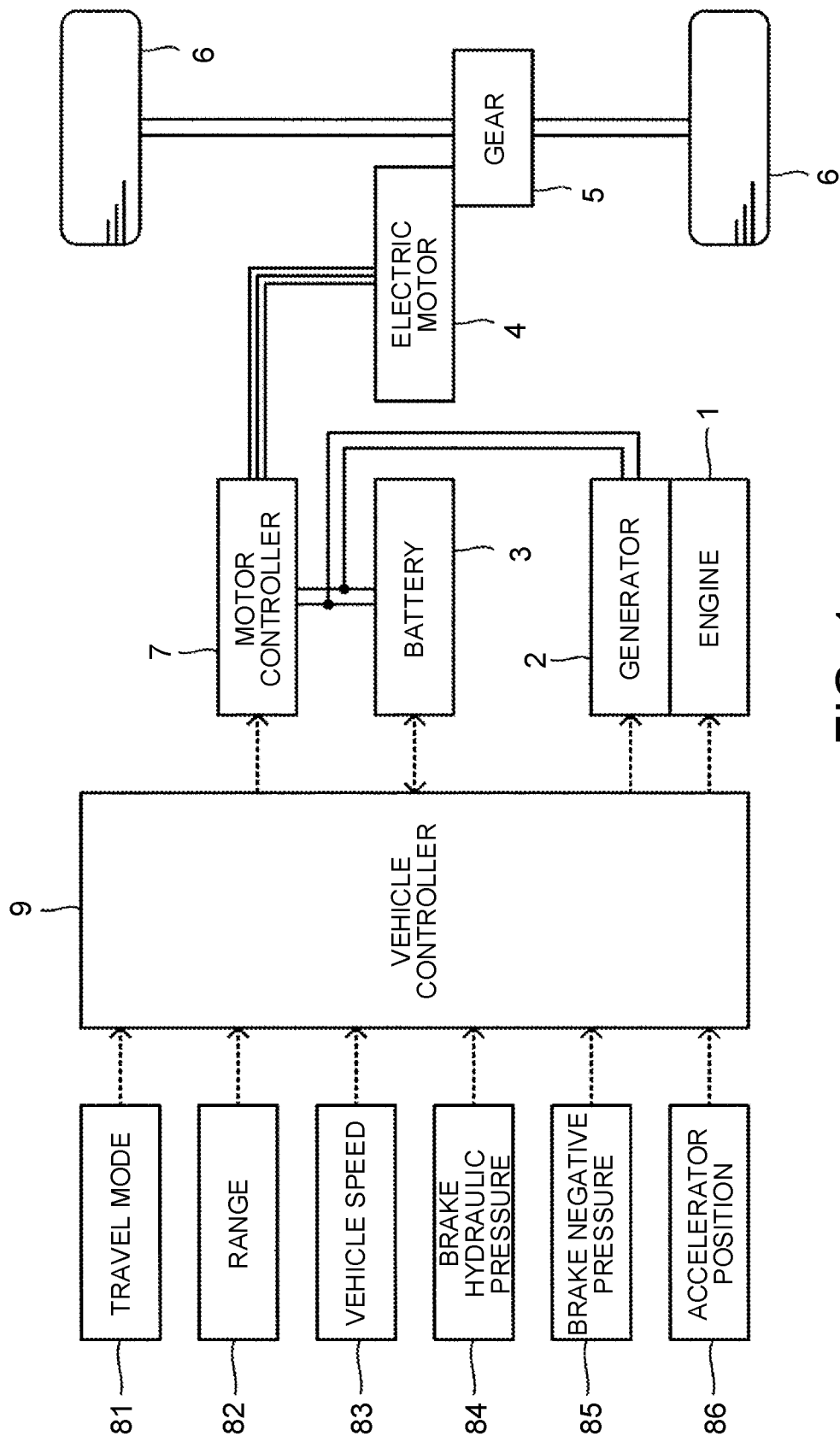
FIG. 1 is a block diagram illustrating the configuration of a hybrid vehicle to which this embodiment is applied.

FIG. 1 is a block diagram illustrating the configuration of a hybrid vehicle to which this embodiment is applied. The hybrid vehicle to which this embodiment is applied includes an engine 1, a generator 2, a battery 3, an electric motor 4, wheels 6 (drive wheels), and a motor controller 7 that controls the electric motor 4.

The wheels 6 are not driven by the engine 1, but are driven by electric power supplied from the battery 3, and the engine 1, the battery 3, and the wheels 6 are connected in series (in series connection), and therefore, the hybrid vehicle is called a series hybrid vehicle.

The engine 1 is mechanically connected to the generator 2 via a speed reducer (not illustrated). The generator 2 is connected to the battery 3 so as to be able to transmit and receive electric power therebetween. The battery 3 and the motor controller 7 are connected to each other and the motor controller 7 and the electric motor 4 are connected to each other in such a way as to be able to transmit and receive electric power therebetween.

A driving force of the engine 1 is transmitted to the generator 2, and the generator 2 generates electric power by the driving force of the engine 1. The electric power generated by the generator 2 is charged to the battery 3. The electric power charged to the battery 3 is transmitted to the electric motor 4 via the motor controller 7, and the electric motor 4 is driven by the electric power supplied from the battery 3. The wheels 6 are rotated by a driving force of the electric motor 4 via a gear 5 so that the hybrid vehicle travels. During deceleration, the electric motor 4 generates regenerative electric power by applying a regenerative braking force to the wheels 6, and the regenerative electric power is charged to the battery 3 via the motor controller 7. When the SOC (charge rate) of the battery 3 becomes equal to or more than a predetermined value so that the upper limit charging power becomes less than the regenerative electric power, excess regenerative electric power is not charged to the battery 3, but is supplied to the generator 2 so that the excess regenerative electric power is consumed by driving the generator 2 to rotate the engine 1.

The hybrid vehicle includes a mode switch 81 for alternatively selecting one of a plurality of travel modes, a select lever 82 to be operated by a driver when selecting a range of an automatic transmission, a vehicle speed sensor 83 for detecting a speed of the vehicle, a brake hydraulic pressure sensor 84 for detecting a braking force, a brake negative pressure sensor 85 for detecting a brake negative pressure for use in assisting a brake depressing operation, an accelerator position sensor 86 for detecting an accelerator opening degree, and a vehicle controller 9 (catalyst warm-up control apparatus) for controlling the entirety of the hybrid vehicle.

The vehicle controller 9 is electrically connected to the mode switch 81, the select lever 82, the vehicle speed sensor 83, the brake hydraulic pressure sensor 84, the brake negative pressure sensor 85, and the accelerator position sensor 86. The vehicle controller 9 receives a signal indicative of the selected travel mode from the mode switch 81, a signal indicative of the selected range from the select lever 82, a signal indicative of the speed of the hybrid vehicle from the vehicle speed sensor 83, a signal indicative of the brake hydraulic pressure from the brake hydraulic pressure sensor 84, a signal indicative of the brake negative pressure from the brake negative pressure sensor 85, and a signal indicative of the accelerator opening degree from the accelerator position sensor 86.

The travel modes that can be selected by the mode switch 81 include a normal mode in which the regenerative braking force by the electric motor 4 is relatively small, an eco-mode in which the regenerative braking force is greater than that in the normal mode, a charge mode in which the power generation by the engine 1 is performed according to the operation of the mode switch 81, a manner mode in which the power generation by the engine 1 is stopped according to the operation of the mode switch 81, and so on.

The ranges that can be selected by the select lever 82 include a drive range, a reverse range, a neutral range, a parking range, and so on.

The vehicle controller 9 is connected to the engine 1, the generator 2, the battery 3, and the motor controller 7. The vehicle controller 9 transmits an engine torque command value (hereinafter referred to as a torque command value) to the engine 1, a rotation speed command value to the generator 2, and a motor torque command value to the motor controller 7.

The vehicle controller 9 can be realized by a general purpose microcomputer including, for example, a CPU (Central Processing Unit), a memory, and an input/output unit. A computer program for functioning the microcomputer as the vehicle controller 9 is installed in the microcomputer and executed. While the vehicle controller 9 can be realized by the software in this way, the individual hardware may be configured for each of units that perform information processing in the vehicle controller 9. Likewise, the motor controller 7 can also be configured as the software or the hardware.

The vehicle controller 9 (later-described ECU 91) causes the engine 1 and the generator 2 to perform power generation so as to charge the battery 3 when the SOC of the battery 3 becomes less than a predetermined lower limit value, and limits the power generation amount or stops the power generation when the SOC of the battery 3 has reached a predetermined upper limit value. Further, when regenerative electric power greater than the upper limit charging power of the battery 3 is generated, the vehicle controller 9 supplies excess regenerative electric power to the generator 2 to rotate the engine 1, thereby consuming the excess regenerative electric power. Further, when the brake negative pressure becomes smaller than a predetermined value, the vehicle controller 9 supplies electric power to the generator 2 to rotate the engine 1, thereby restoring the brake negative pressure.

Figure 2:
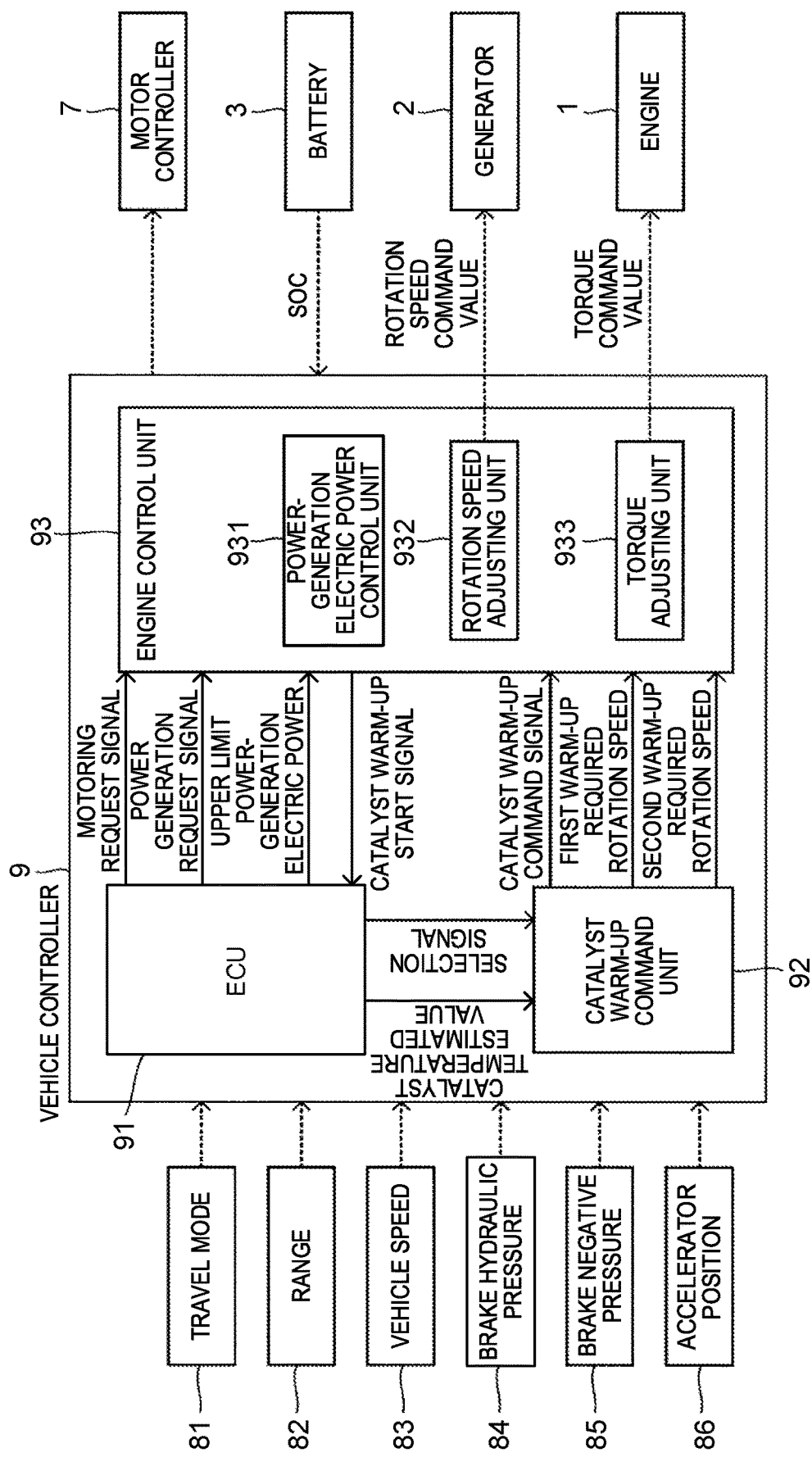
FIG. 2 is a control block diagram of a catalyst warm-up control apparatus for the hybrid vehicle of this embodiment.

FIG. 2 is a control block diagram of a catalyst warm-up control apparatus for the hybrid vehicle of this embodiment. As illustrated in FIG. 2, the vehicle controller 9 includes an ECU 91 (Engine Control Unit) (may be configured separately from the vehicle controller 9), a catalyst warm-up command unit 92 (catalyst warm-up control apparatus), and an engine control unit 93 (catalyst warm-up control apparatus). By these constituent elements, catalyst warm-up control for a catalyst (not illustrated) disposed in the exhaust system of the engine 1 can be performed.

The ECU 91 performs control of the entirety of the hybrid vehicle based on the travel mode, the range, the signals input from the various sensors, and the computer program. Based on the travel state (including the state of the SOC) of the hybrid vehicle, the ECU 91 can transmit a power generation request signal or a motoring request signal to the engine control unit 93 and stop the transmission of these signals.

The power generation request signal is a signal requesting power generation using the engine 1 and the generator 2. When transmitting the power generation request signal, the ECU 91 calculates an upper limit power-generation electric power, that can be generated by the engine 1 and the generator 2, based on information of the SOC transmitted from the battery 3, and transmits it to the engine control unit 93. The motoring request signal is transmitted when consuming the excess regenerative electric power or restoring the brake negative pressure as described above.

Further, the ECU 91 estimates a temperature of the catalyst disposed in the exhaust system of the engine 1 based on the travel state of the hybrid vehicle, and transmits information of a catalyst temperature estimated value to the catalyst warm-up command unit 92. Instead of the estimation, the temperature of the catalyst may be actually measured by a temperature sensor (not illustrated) or the like.

When the travel mode other than the manner mode is selected, the catalyst warm-up command unit 92 determines whether or not to perform the catalyst warm-up control of the catalyst based on the catalyst temperature estimated value (or the measured value by the temperature sensor). When the catalyst temperature estimated value falls below a normal threshold temperature (threshold temperature) (becomes lower than the normal threshold temperature) for activating the catalyst, the catalyst warm-up command unit 92 transmits a catalyst warm-up command signal (a catalyst warm-up control request flag (1)) and information of a first warm-up required rotation speed to the engine control unit 93, and when the temperature of the catalyst has reached a warm-up required temperature, the catalyst warm-up command unit 92 stops the catalyst warm-up command signal (transmits a catalyst warm-up control request flag (0)). The catalyst warm-up command signal is stopped when the catalyst temperature estimated value has reached the warm-up required temperature or after the catalyst warm-up command signal is transmitted for a predetermined time (e.g. 15 seconds). On the other hand, the operation of the catalyst warm-up command unit 92 when the manner mode is selected will be described later.

The catalyst warm-up command unit 92 sets threshold temperatures (the normal threshold temperature and a later-described manner mode threshold temperature) and the first warm-up required rotation speed (and a later-described second warm-up required rotation speed) based on the vehicle speed transmitted from the vehicle speed sensor 83 (see FIG. 3). It may be configured that the ECU 91 sets the threshold temperatures, the first warm-up required rotation speed, and so on and transmits them to the catalyst warm-up command unit 92.

The engine control unit 93 includes a power-generation electric power control unit 931 that calculates (controls) a target rotation speed and a target torque based on the SOC of the battery 3, a rotation speed adjusting unit 932 that generates a rotation speed command value based on the target rotation speed and transmits it to the generator 2, and a torque adjusting unit 933 that generates a torque command value based on the target torque and transmits it to the engine 1.

The power-generation electric power control unit 931 operates the engine 1 and the generator 2 when the power generation request signal or the catalyst warm-up command signal is received, and stops the engine 1 and the generator 2 when the power generation request signal or the catalyst warm-up command signal is stopped. The power-generation electric power control unit 931 operates the generator 2 without operating the engine 1 when the motoring request signal is received, and stops the generator 2 when the motoring request signal is stopped.

When the power generation request signal is received, the power-generation electric power control unit 931 calculates a target rotation speed and a target torque based on information of the upper limit power-generation electric power transmitted from the ECU 91. Alternatively, the power-generation electric power control unit 931 may include a map (SOC, target rotation speed, target torque) in which the SOC, the target rotation speed, and the target torque are correlated with each other, and may extract the target rotation speed and the target torque from the map using information of the SOC transmitted from the battery 3.

In the engine 1 and the generator 2, it is preferable to perform power generation by the optimization rotation speed and the optimization torque at which the fuel efficiency of the engine 1 is maximized. Therefore, the power-generation electric power control unit 931 makes a comparison between the optimization power-generation electric power obtained by the product of the optimization rotation speed and the optimization torque, and the upper limit power-generation electric power transmitted from the ECU 91, and when the optimization power-generation electric power is less than the upper limit power-generation electric power, the power-generation electric power control unit 931 controls the target rotation speed to the optimization rotation speed and the target torque to the optimization torque and performs power generation using the engine 1 and the generator 2.

On the other hand, the upper limit power-generation electric power decreases as the SOC increases. Therefore, when the upper limit power-generation electric power becomes less than the optimization power-generation electric power, the power-generation electric power control unit 931 calculates the target rotation speed and the target torque so as to be equal to the upper limit power-generation electric power. In this event, the target rotation speed and the target torque are calculated so that abnormal noise such as rattle sound in the engine 1 (and abnormal noise generated from the generator 2) do not occur.

When the travel mode other than the manner mode is selected, the catalyst warm-up command signal and information of the first warm-up required rotation speed are transmitted from the catalyst warm-up command unit 92 to the power-generation electric power control unit 931. When the catalyst warm-up command signal is transmitted, the power-generation electric power control unit 931 calculates a target rotation speed based on the information of the first warm-up required rotation speed, and calculates a target torque corresponding to the target rotation speed or extracts a target torque corresponding to the target rotation speed from the map.

Then, the rotation speed adjusting unit 932 generates a rotation speed command value based on the target rotation speed, and the torque adjusting unit 933 generates a torque command value based on the target torque. Finally, when the catalyst warm-up command signal is stopped, the power-generation electric power control unit 931 stops the power generation using the generator 2 and the engine 1. That is, the power-generation electric power control unit 931 transmits a stop signal to the generator 2 and the engine 1 via the rotation speed adjusting unit 932 and the torque adjusting unit 933. The operation of the engine control unit 93 when the manner mode is selected will be described later.

[Normal Threshold Temperature, Manner Mode Threshold Temperature, Warm-Up Required Temperature]

The relationship between the normal threshold temperature for activating the catalyst, the manner mode threshold temperature, the warm-up required temperature of the catalyst, and the vehicle speed will be described. FIG. 3 is a diagram illustrating the relationship between the threshold temperatures for requesting the warm-up of the catalyst, the warm-up required temperature, and the vehicle speed. FIG. 4 is a diagram illustrating the relationship between the actual rotation speed of the engine 1 and the catalyst temperature. FIG. 5 is a diagram illustrating the set values of the normal threshold temperature, the manner mode threshold temperature, and the warm-up required rotation speed based on the vehicle speed.

The catalyst (e.g. three-way catalyst) is used for purifying exhaust gas discharged during the operation of the engine 1. The catalyst exhibits the performance of purification by being warmed up, and particularly when the temperature of the catalyst becomes equal to or higher than a predetermined activation temperature, the catalyst can purify the exhaust gas with high efficiency. On the other hand, when the vehicle speed is low, the target rotation speed (actual rotation speed) of the engine 1 is also generally controlled to be low so that the amount of exhaust gas is also reduced, and therefore, the temperature of the catalyst is allowed to be lower than the activation temperature to some degree. Therefore, in this embodiment, the warm-up required temperature for activating the catalyst is determined based on the vehicle speed.

Figure 3:
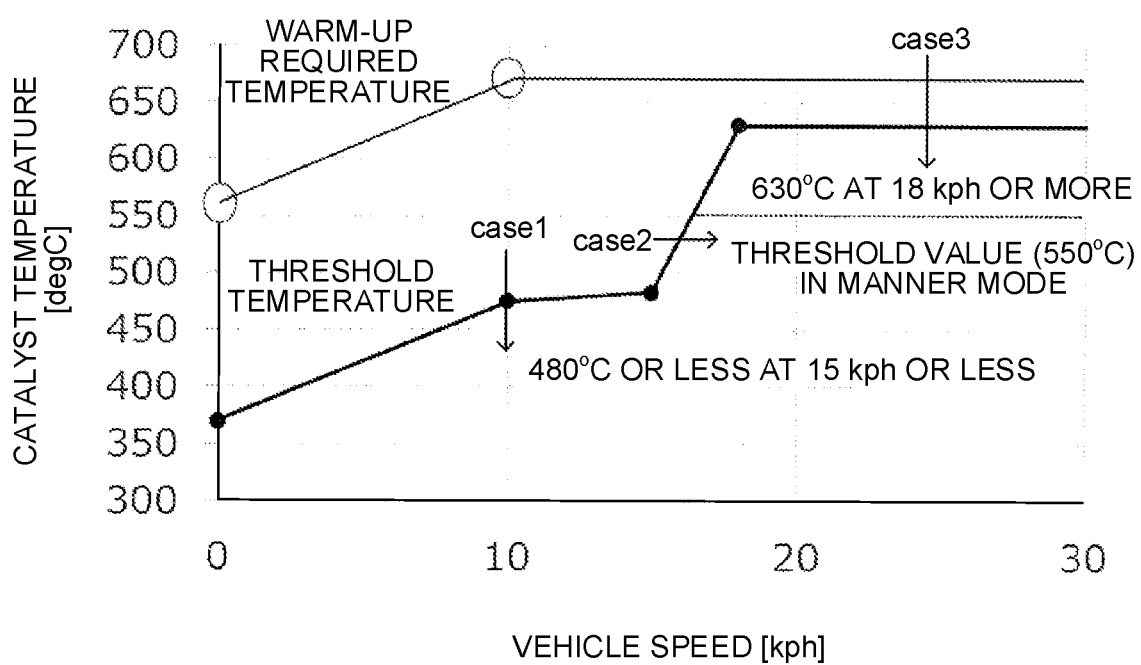
FIG. 3 is a diagram illustrating the relationship between the normal threshold temperature for requesting the warm-up of a catalyst, the warm-up required temperature, and the vehicle speed.

As illustrated in FIG. 3, the normal threshold temperature required for activating the catalyst is equal to or less than 480° C. when the vehicle speed is equal to or less than 15 kph, and is about 630° C. when the vehicle speed is equal to or higher than 18 kph. Therefore, as illustrated in FIG. 5, in this embodiment, the normal threshold temperature is set to 480° C. when the vehicle speed is equal to or less than 15 kph, and set to 630° C. when the vehicle speed is equal to or higher than 18 kph.

As illustrated in FIG. 5, in this embodiment, the manner mode threshold temperature is defined in addition to the normal threshold temperature. The manner mode threshold temperature is a threshold temperature that is applied when the manner mode is selected. The manner mode threshold temperature changes according to the vehicle speed like the normal threshold temperature and is set to the same value as the normal threshold temperature when the vehicle speed is from 0 kph to 15 kph, and set to 550° C. when the vehicle speed is equal to or higher than 18 kph. Details of the manner mode threshold temperature will be described later.

In order to avoid the restart of the catalyst warm-up control in a short time after the end of the catalyst warm-up control, the warm-up required temperature (the temperature of the catalyst after the catalyst warm-up control) is required to be higher than the normal threshold temperature. In this embodiment, the warm-up required temperature is required to be equal to or higher than 550° C. when the vehicle speed is less than 10 kph, and required to be equal to or higher than 660° C. when the vehicle speed is equal to or higher than 10 kph.

As illustrated in FIG. 4, in a range where the actual rotation speed of the engine 1 (the supply amount of exhaust gas) is from 1200 rpm to 3050 rpm, the temperature of the catalyst monotonically increases as the actual rotation speed increases. The temperature of the catalyst exceeds 550° C. when the actual rotation speed of the engine 1 is 1300 rpm, and exceeds 660° C. when the actual rotation speed of the engine 1 is 2000 rpm.

Therefore, in this embodiment, as illustrated in FIG. 5, the first warm-up required rotation speed that realizes the warm-up required temperature is set to 1300 rpm (or 1400 rpm) when the vehicle speed is less than 10 kph (including a case in which the vehicle is stopped), and set to 2000 rpm when the vehicle speed is equal to or higher than 10 kph.

[Relationship Between Manner Mode and Catalyst Warm-Up Control]

As described above, the manner mode is a mode in which the power generation using the generator 2 and the engine 1 is stopped. However, there is a case in which even though the manner mode is selected, the catalyst warm-up control is started immediately thereafter due to a determination that the temperature of the catalyst falls below the threshold temperature, thus giving a sense of incongruity to the driver. As the situation where the catalyst warm-up control is started, there is a case in which the temperature of the catalyst is actually lowered to be less than the normal threshold temperature, or a case in which even in the state where there is hardly any substantial change in the temperature of the catalyst, the normal threshold temperature is changed to a higher value due to an increase in the vehicle speed, and as a result, the temperature of the catalyst becomes lower than the normal threshold temperature.

Case 1 illustrated in FIG. 3 is a case in which after the manner mode is selected, the temperature of the catalyst is lowered to be less than the normal threshold temperature (480° C.) so that the catalyst warm-up control is started. In particular, there is a case in which the SOC is increased in the charge mode so that the upper limit power-generation electric power that can be generated by the generator 2 and the engine 1 is limited, resulting in a reduction in the temperature of the catalyst. When shifted to the manner mode in this state, since the temperature at the time of the shift approaches the normal threshold temperature, the catalyst warm-up control is started in a short time after the shift. Then, the power-generation electric power (target rotation speed) continues to be limited as long as the high SOC state is maintained, and therefore, there is a possibility that the catalyst warm-up control occurs over and over again.

In view of this, in Case 1, in order to prevent the catalyst warm-up control from starting immediately after the selection of the manner mode, control is performed to prohibit the catalyst warm-up control until the temperature of the catalyst at the time of the selection (start) of the manner mode is lowered by a predetermined temperature (e.g. 20° C.). Consequently, the stop period of the engine 1 after the selection of the manner mode can be minimally ensured by using the time until the temperature of the catalyst is lowered by the predetermined temperature. When the temperature of the catalyst after being lowered by the predetermined temperature is higher than the normal threshold temperature, the stop period of the engine 1 can be prolonged until the temperature of the catalyst becomes lower than the normal threshold temperature.

Case 2 is a case in which the vehicle speed is less than 15 kph and the temperature of the catalyst is higher than the threshold temperature (480° C.) at the time of the selection of the manner mode, then the vehicle speed becomes higher than 18 kph so that the set value of the threshold temperature is changed, and consequently, the temperature of the catalyst is determined to be lower than the threshold temperature (630° C.) so that the catalyst warm-up control is started. In Case 1, the catalyst warm-up control occurs depending on a reduction in the temperature of the catalyst, while, in Case 2, the catalyst warm-up control occurs immediately due to an increase in the vehicle speed regardless of a reduction in the temperature of the catalyst.

Accordingly, in Case 2, like in Case 1, in order to prevent the catalyst warm-up control from starting immediately after the selection of the manner mode, control is performed to prohibit the catalyst warm-up control until the temperature of the catalyst at the time of the selection of the manner mode is lowered by a predetermined temperature (e.g. 20° C.).

Case 3 is a case in which when the vehicle speed is maintained to be equal to or higher than 18 kph, the temperature of the catalyst is equal to or higher than the threshold temperature (630° C.) at the time of the selection of the manner mode, but thereafter, the temperature of the catalyst becomes lower than the threshold temperature (630° C.) so that the catalyst warm-up control is started. In Case 3, the catalyst warm-up control occurs due to a reduction in the temperature of the catalyst like in Case 1, but the temperature of the catalyst is higher than that in the case of Case 1.

Also in Case 3, in order to prevent the catalyst warm-up control from starting immediately after the selection of the manner mode, control can be performed to prohibit the catalyst warm-up control until the temperature of the catalyst at the time of the start of the manner mode is lowered by a predetermined temperature (e.g. 20° C.).

In the meantime, it has been found by the inventors of this application that the amount of untreated gas with insufficient purification to be discharged to the outside when the temperature of the catalyst is 667° C. at 2000 rpm (FIG. 4), and the amount of untreated gas when the temperature of the catalyst is 549° C. at 1200 rpm (FIG. 4) do not differ so much from each other. Accordingly, in the case of Case 3, i.e. when the vehicle speed is higher than 18 kph, the threshold temperature can be set to the manner mode threshold temperature (550° C.) that is lower than the normal threshold temperature (630° C.). Consequently, the time until the temperature of the catalyst is lowered from the normal threshold temperature (630° C.) to the manner mode threshold temperature (550° C.) can be used as the stop period of the engine 1. By controlling in this way, the stop period of the engine 1 after selecting the manner mode can be made longer than Case 1 and Case 2.

As illustrated in FIG. 5, when the vehicle speed is equal to or less than 15 kph, the manner mode threshold temperature is set to the same value as the normal threshold temperature, but may be set to a value less than the normal threshold temperature based on the purification ability of the catalyst.

As described above, in this embodiment, in order to delay the start of the catalyst warm-up control after the manner mode is selected, the control is performed to refer to the manner mode threshold temperature, not to the normal threshold temperature, when the manner mode is selected, and to prohibit the catalyst warm-up control until the temperature of the catalyst is lowered from the temperature of the catalyst at the time of the selection of the manner mode by the predetermined temperature (e.g. 20° C.).

In any of the cases, the temperature of the catalyst takes the value less than the threshold temperature (480° C., 630° C.) at the time of the start of the catalyst warm-up control, and if, in this state, the target rotation speed of the engine 1 is set to the warm-up required rotation speed (the first warm-up required rotation speed: e.g. 2000 rpm) at which the catalyst can be heated to the warm-up required temperature (667° C.), there is a possibility that a large amount of untreated gas is discharged.

Therefore, in this embodiment, when the catalyst warm-up control is performed after the selection of the manner mode, it is preferable to perform the catalyst warm-up control such that the catalyst is heated while suppressing the amount of exhaust gas (untreated gas) to be discharged by controlling the target rotation speed of the engine 1 to a second warm-up required rotation speed (e.g. 1300 rpm or 1350 rpm) that is lower than the first warm-up required rotation speed, and that the catalyst is warmed up by controlling the target rotation speed to the first warm-up required rotation speed after the lapse of a predetermined time (e.g. 20 seconds). Consequently, it is possible to suppress the generation of untreated gas.

[Catalyst Warm-Up Control after Selection of Manner Mode]

As illustrated in FIG. 2, when a signal indicative of the selection of the manner mode is received from the mode switch 81, the ECU 91 transmits a selection signal to the catalyst warm-up command unit 92. When the selection signal is received from the ECU 91, the catalyst warm-up command unit 92 stores a catalyst temperature estimated value (or a measured value by the temperature sensor) at the time of the receipt of the selection signal. Then, when the catalyst warm-up command unit 92 determines that a catalyst temperature estimated value transmitted thereafter is not yet lowered from the stored catalyst temperature estimated value by a predetermined temperature (e.g. 20° C.), the catalyst warm-up command unit 92 determines that a catalyst warm-up command signal cannot be transmitted. On the other hand, when the catalyst warm-up command unit 92 determines that the catalyst temperature estimated value is lowered from the stored catalyst temperature estimated value by the predetermined temperature, the catalyst warm-up command unit 92 determines that the catalyst warm-up command signal can be transmitted.

The catalyst warm-up command unit 92 makes a comparison between the catalyst temperature estimated value transmitted currently at the time of the determination that the catalyst warm-up command signal can be transmitted, and the manner mode threshold temperature. When the catalyst temperature estimated value falls below the manner mode threshold temperature (when the catalyst temperature estimated value is lower than the manner mode threshold temperature), the catalyst warm-up command unit 92 transmits the catalyst warm-up command signal, and conversely, when the catalyst temperature estimated value is higher than the manner mode threshold temperature, the catalyst warm-up command unit 92 suspends the transmission of the catalyst warm-up command signal, and thereafter, when the catalyst temperature estimated value becomes lower than the manner mode threshold temperature, the catalyst warm-up command unit 92 transmits the catalyst warm-up command signal to the engine control unit 93 (the power-generation electric power control unit 931).

The catalyst warm-up command unit 92 transmits information of the second warm-up required rotation speed to the engine control unit 93 along with the catalyst warm-up command signal, and after the lapse of a predetermined time (e.g. 20 seconds), the catalyst warm-up command unit 92 transmits information of the first warm-up required rotation speed to the engine control unit 93. The catalyst warm-up command signal is stopped when the catalyst temperature estimated value has reached the warm-up required temperature, or when a predetermined time (e.g. 15 seconds) has elapsed from the transmission of the information of the first warm-up required rotation speed.

When the manner mode is selected, the catalyst warm-up command signal and the information of the second warm-up required rotation speed are transmitted, and after the lapse of the predetermined time (e.g. 20 seconds), the information of the first warm-up required rotation speed is transmitted, from the catalyst warm-up command unit 92 to the power-generation electric power control unit 931.

When the catalyst warm-up command signal is transmitted, the power-generation electric power control unit 931 calculates a target rotation speed based on the information of the second warm-up required rotation speed, and calculates a target torque corresponding to the target rotation speed or extracts a target torque corresponding to the target rotation speed from the map. Then, the rotation speed adjusting unit 932 generates a rotation speed command value based on the target rotation speed, and the torque adjusting unit 933 generates a torque command value based on the target torque.

After the lapse of the predetermined time, the power-generation electric power control unit 931 calculates a target rotation speed based on the information of the first warm-up required rotation speed, and calculates a target torque corresponding to the target rotation speed or extracts a target torque corresponding to the target rotation speed from the map. Then, the rotation speed adjusting unit 932 generates a rotation speed command value based on the target rotation speed, and the torque adjusting unit 933 generates a torque command value based on the target torque.

Finally, when the transmission of the catalyst warm-up command signal from the catalyst warm-up command unit 92 is stopped, the power-generation electric power control unit 931 stops the power generation using the engine 1 and the generator 2 so that the catalyst warm-up control ends.

On the other hand, when the catalyst warm-up command signal is received, the engine control unit 93 transmits a catalyst warm-up control start signal to the ECU 91. When the catalyst warm-up control start signal is received after transmitting the selection signal, the ECU 91 releases the manner mode and switches the travel mode to, for example, the normal mode. The ECU 91 may perform control not to release the manner mode even when the catalyst warm-up control start signal is received, and to allow the driver to arbitrarily release the manner mode by an operation of the driver.

When the discharge of untreated gas can be suppressed to be low even by controlling the target rotation speed of the engine 1 to the first warm-up required rotation speed from the start of the catalyst warm-up control due to the purification performance of the catalyst, the target rotation speed of the engine 1 may be controlled to the first warm-up required rotation speed from the start of the catalyst warm-up control even in the catalyst warm-up control after the manner mode.

[Time Chart of Case 1]

Figure 6:
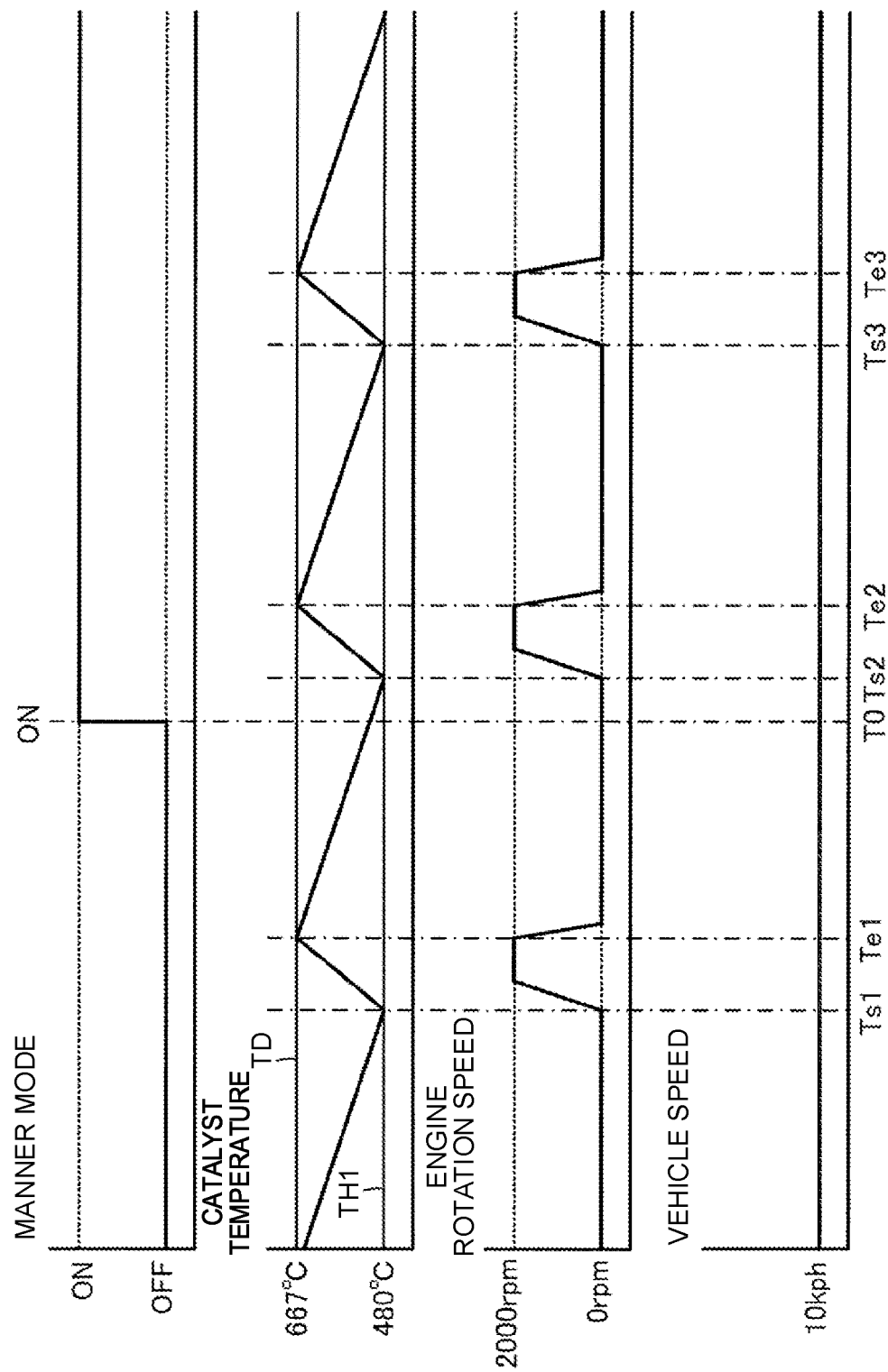
FIG. 6 is a time chart of Case 1 in FIG. 3.
Figure 7:
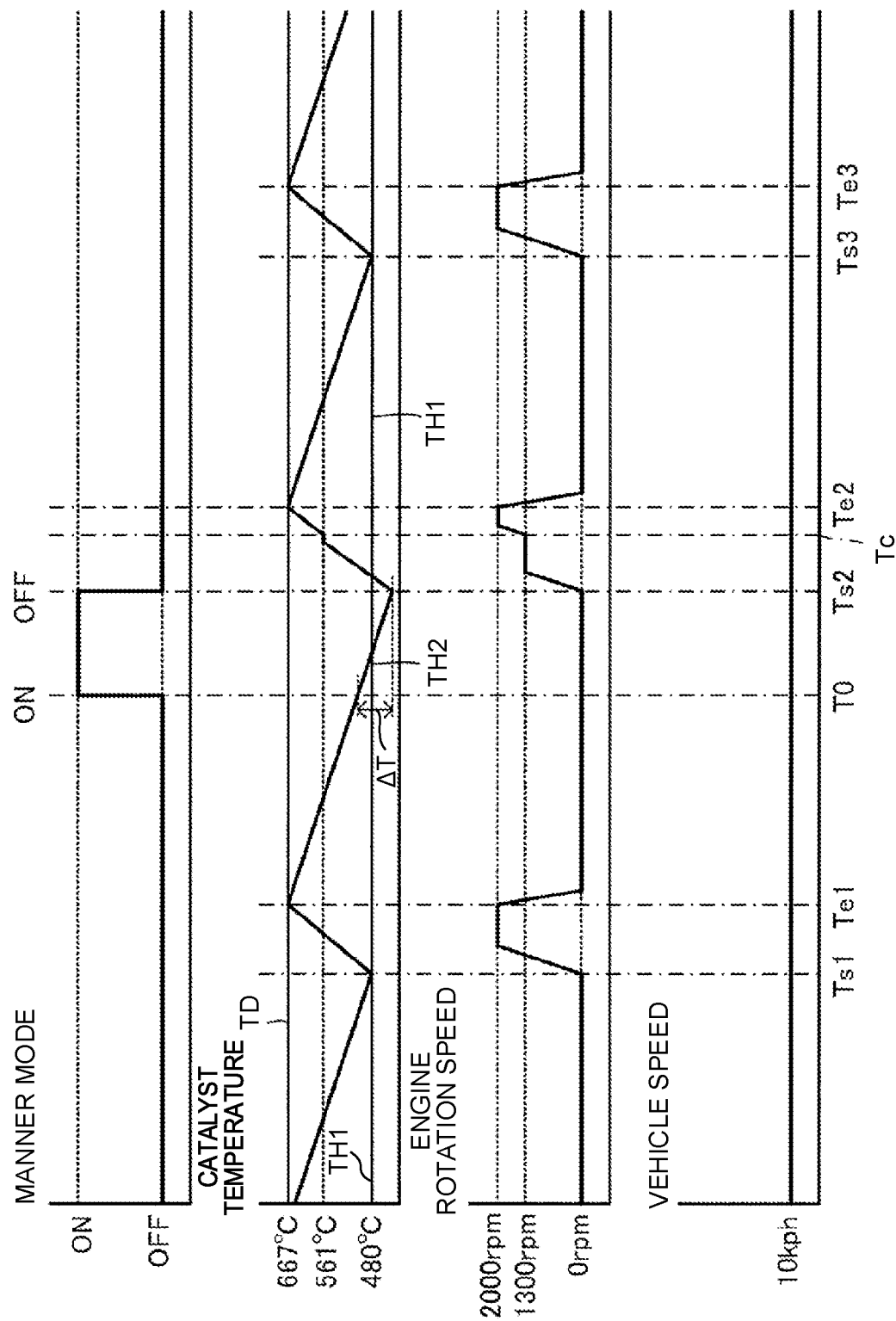
FIG. 7 is a time chart when catalyst warm-up control of this embodiment is applied in Case 1 in FIG. 3.

FIG. 6 is a time chart of Case 1 in FIG. 3. FIG. 7 is a time chart when the catalyst warm-up control of this embodiment is applied in Case 1 in FIG. 3. As illustrated in FIG. 6, in Case 1, the vehicle speed of the hybrid vehicle is assumed to be constant at 10 kph. Consequently, a normal threshold temperature (TH1) is set to, for example, 480° C., a warm-up required temperature (TD) is set to, for example, 667° C., and a warm-up required rotation speed is set to, for example, 2000 rpm.

The temperature of the catalyst (catalyst temperature estimated value) becomes lower than the normal threshold temperature (TH1=480° C.) at time Ts1 so that the engine 1 is operated at the warm-up required rotation speed (2000 rpm), and the temperature of the catalyst reaches the warm-up required temperature (TD=667° C.) at time Te1 so that the engine 1 is stopped. The manner mode is selected at time T0, but thereafter, the temperature of the catalyst becomes lower than the normal threshold temperature (TH1) again at time Ts2 so that the engine 1 is operated, and thereafter, the temperature of the catalyst reaches the warm-up required temperature (TD) at time Te2 so that the engine 1 is stopped. Thereafter, likewise, the engine 1 is operated at time Ts3, and then the engine 1 is stopped at time Te3.

In this way, in Case 1, even though the manner mode is selected at time T0, since the engine 1 is operated immediately thereafter at time Ts2, a sense of incongruity is given to the driver. Further, even though the manner mode is selected at time T0 and the manner mode is continued thereafter, since the engine 1 is operated at time Ts2 and time Ts3, a sense of incongruity is given to the driver.

On the other hand, as illustrated in FIG. 7, in the case where the catalyst warm-up control of this embodiment is applied, when the manner mode is selected at time T0, the threshold temperature for determining whether or not to perform the catalyst warm-up control is switched from the normal threshold temperature (TH1) to a manner mode threshold temperature (TH2). However, regardless of the normal threshold temperature (TH1) and the manner mode threshold temperature (TH2), the catalyst warm-up control is prohibited until the temperature of the catalyst is lowered from the temperature of the catalyst at the time of the selection of the manner mode by a predetermined temperature ($\Delta T=20°$ C.).

Then, when the temperature of the catalyst is lowered from the temperature of the catalyst at the time of the selection of the manner mode (time T0) by the predetermined temperature ($\Delta T$=e.g. 20° C.), the catalyst warm-up control is allowed (time Ts2). In this event, when the temperature of the catalyst is lower than the manner mode threshold temperature (TH2), the catalyst warm-up control is started and the manner mode is released at time Ts2.

On the other hand, when the temperature of the catalyst at which the catalyst warm-up control is allowed is higher than the manner mode threshold temperature (TH2), the catalyst warm-up control is not performed at that time point, and thereafter, when the temperature of the catalyst becomes lower than the manner mode threshold temperature, the catalyst warm-up control is started.

In the catalyst warm-up control, the target rotation speed of the engine 1 is, at first, set to a second warm-up required rotation speed (1300 rpm), and after the lapse of a predetermined time (e.g. 20 seconds) (time Tc), the target rotation speed is set to a first warm-up required rotation speed (2000 rpm), and after the lapse of a predetermined time (e.g. 15 seconds) (time Te2), the engine 1 is stopped.

In the catalyst warm-up control, the threshold temperature for determining whether or not to perform the catalyst warm-up control is switched from the manner mode threshold temperature (TH2) to the normal threshold temperature (TH1).

By performing the catalyst warm-up control described above, the stop period (Ts2-T0) of the engine 1 from the selection of the manner mode (time T0) to the start of the catalyst warm-up control (time Ts2) can be ensured by a time (e.g. 1 minute) during which the temperature of the catalyst is lowered by $\Delta T$ (e.g. 20° C.), and therefore, a sense of incongruity is not given to the driver. Consequently, the stop period (Ts2-T0) can be used as a continuation time of the manner mode so that even when the manner mode is released at time Te2, a sense of incongruity is not given to the driver.

[Time Chart of Case 2]

Figure 8:
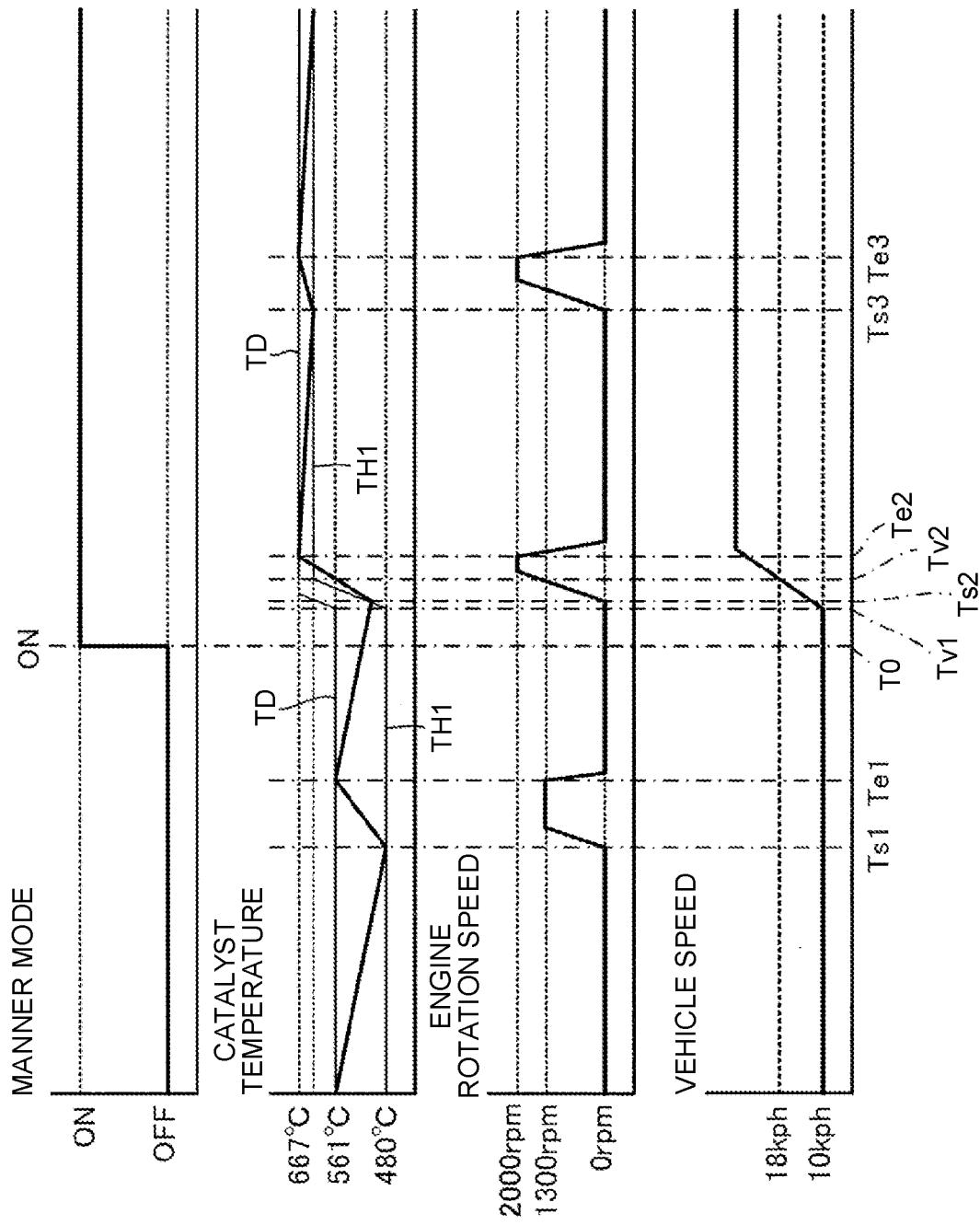
FIG. 8 is a time chart of Case 2 in FIG. 3.
Figure 9:
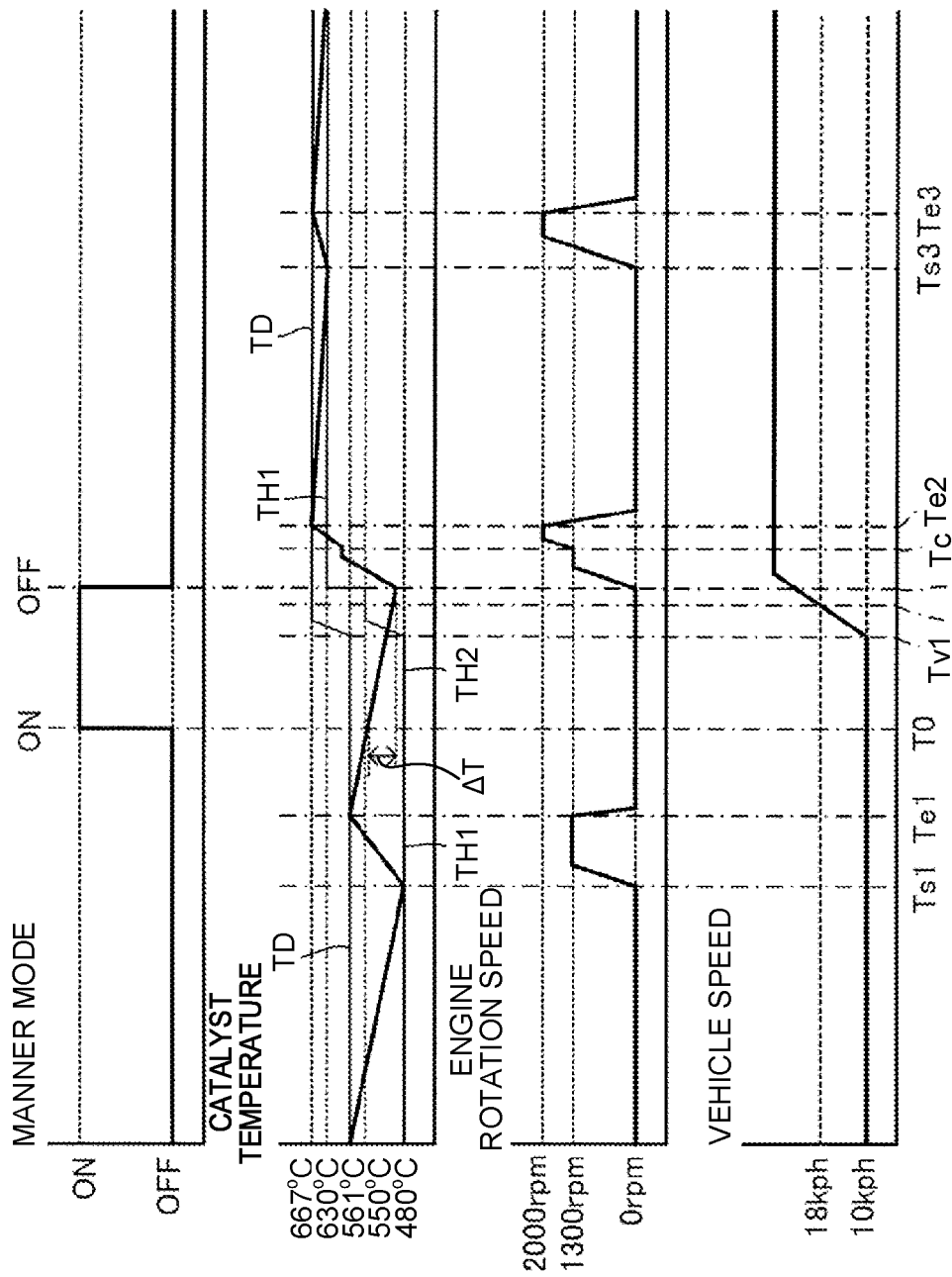
FIG. 9 is a time chart when the catalyst warm-up control of this embodiment is applied in Case 2 in FIG. 3.

FIG. 8 is a time chart of Case 2 in FIG. 3. FIG. 9 is a time chart when the catalyst warm-up control of this embodiment is applied in Case 2 in FIG. 3. As illustrated in FIG. 8, in Case 2, the vehicle speed of the hybrid vehicle is assumed to be 10 kph as an initial state. Consequently, a normal threshold temperature (TH1) is set to, for example, 480° C., a warm-up required temperature (TD) is set to, for example, 561° C., and a warm-up required rotation speed is set to, for example, 2000 rpm.

When the temperature of the catalyst becomes lower than the normal threshold temperature (TH1=480° C.) at time Ts1, the engine 1 is operated at the warm-up required rotation speed (2000 rpm), and when the temperature of the catalyst reaches the warm-up required temperature (TD=561° C.) at time Te1, the engine 1 is stopped.

In Case 2, it is assumed that the manner mode is selected at time T0 after time Te1, that, immediately thereafter at time Tv1, the vehicle speed starts to increase by an accelerator operation of the driver, and that the vehicle speed exceeds 18 kph at time Tv2. After time Tv2, the normal threshold temperature (TH1) is set to, for example, 630° C., and the warm-up required temperature (TD) is set to, for example, 667° C.

Between time Tv1 and time Tv2, the normal threshold temperature (TH1) increases as the vehicle speed increases (or may be changed from 480° C. to 630° C. in a step response manner), and exceeds the temperature of the catalyst at time Ts2 between time Tv1 and time Tv2 so that the engine 1 is operated.

In this way, even though the manner mode is selected, the engine 1 is operated due to an increase in the vehicle speed immediately thereafter so that a sense of incongruity is given to the driver.

Thereafter, when the temperature of the catalyst becomes lower than the normal threshold temperature (TH1=630° C.) at time Ts3, the engine 1 is operated, and when the temperature of the catalyst reaches the warm-up required temperature (TD=667° C.) at time Te3, the engine 1 is stopped. In this way, even though the manner mode is continued, the engine 1 is operated at time Ts3 so that a sense of incongruity is given to the driver.

On the other hand, as illustrated in FIG. 9, in the case where the catalyst warm-up control of this embodiment is applied, when the manner mode is selected at time T0, like in Case 1, regardless of a manner mode threshold temperature (TH2), the catalyst warm-up control is prohibited until the temperature of the catalyst is lowered from the temperature of the catalyst at the time of the selection of the manner mode by a predetermined temperature ($\Delta T=20°$ C.). Consequently, the stop period (Ts2-T0) of the engine 1 can be ensured by a time (e.g. 1 minute) during which the temperature of the catalyst is lowered by ΔT, and therefore, a sense of incongruity is not given to the driver. Like in Case 1, even when the manner mode is released with the operation of the engine 1 (the start of the catalyst warm-up control), a sense of incongruity is not given to the driver.

When the temperature of the catalyst at which the catalyst warm-up control is allowed is higher than the manner mode threshold temperature (TH2=550° C.), the catalyst warm-up control is not performed at that time point, and thereafter, when the temperature of the catalyst becomes lower than the manner mode threshold temperature (TH2), the catalyst warm-up control is started.

[Time Chart of Case 3]

Figure 10:
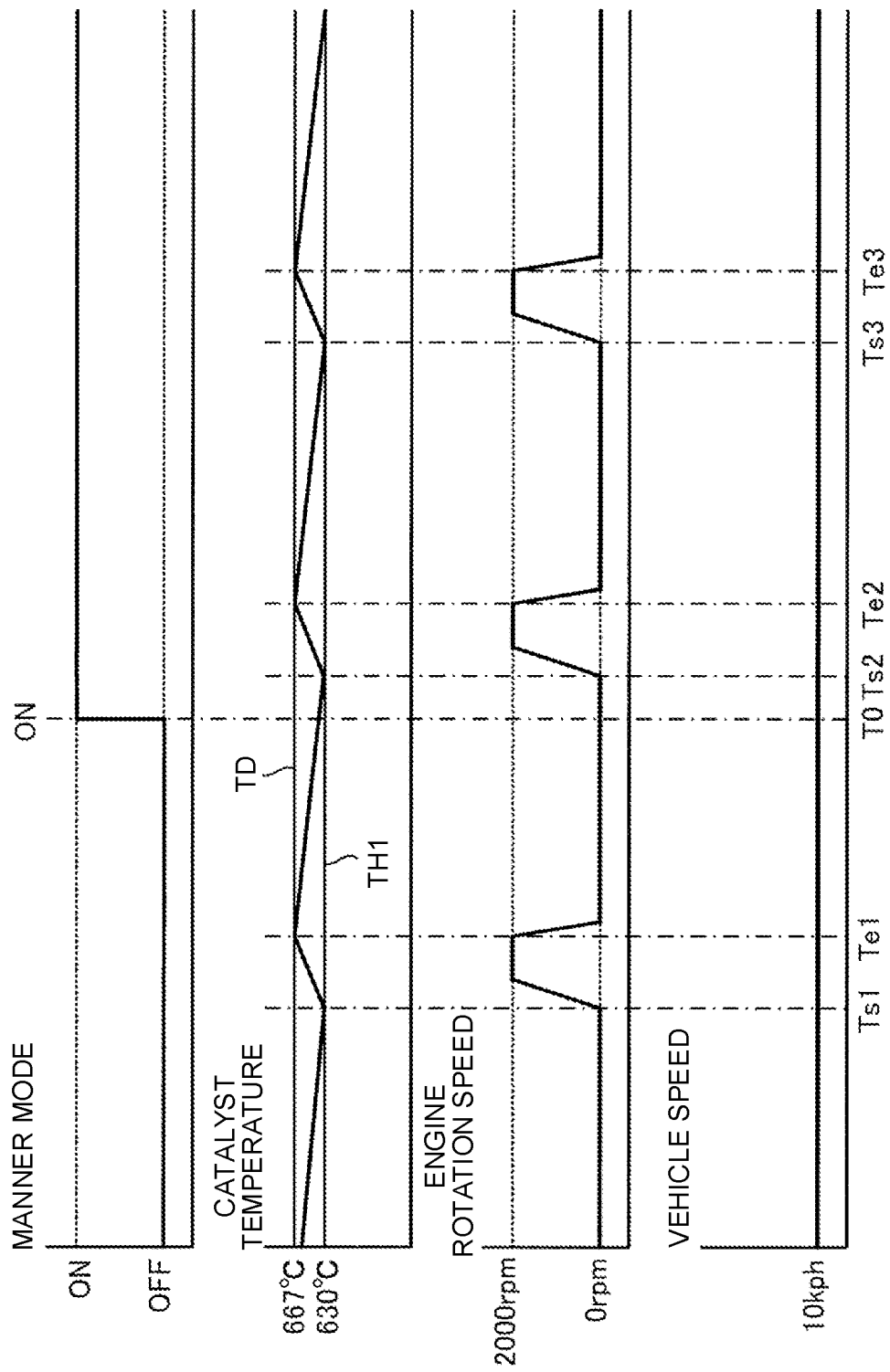
FIG. 10 is a time chart of Case 3 in FIG. 3.
Figure 11:
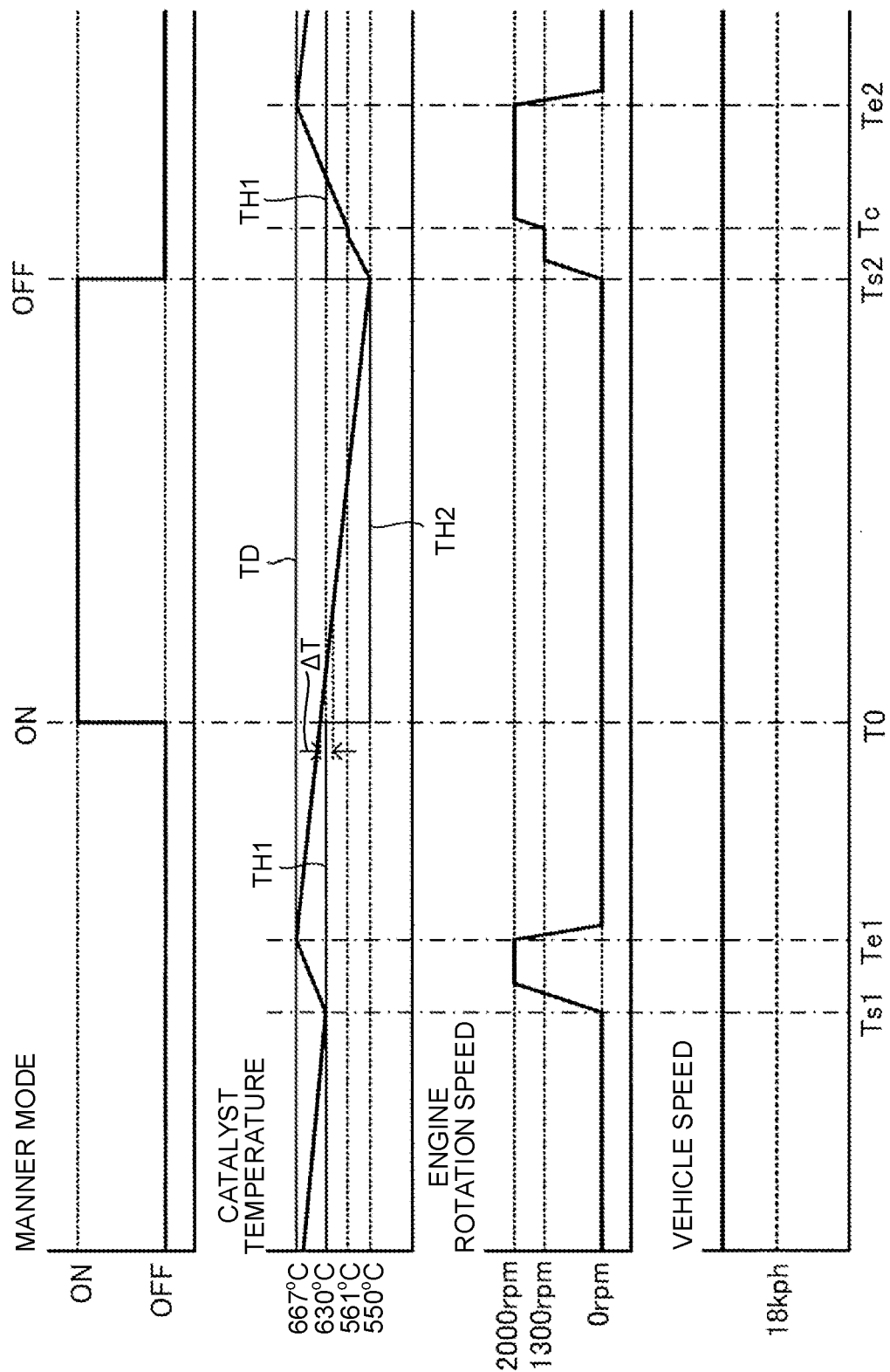
FIG. 11 is a time chart when the catalyst warm-up control of this embodiment is applied in Case 3 in FIG. 3.

FIG. 10 is a time chart of Case 3 in FIG. 3. FIG. 11 is a time chart when the catalyst warm-up control of this embodiment is applied in Case 3 in FIG. 3. As illustrated in FIG. 10, in Case 3, the vehicle speed of the hybrid vehicle is assumed to be equal to or higher than 18 kph. Consequently, a normal threshold temperature (TH1) is set to, for example, 630° C., a warm-up required temperature (TD) is set to, for example, 667° C., and a warm-up required rotation speed is set to, for example, 2000 rpm.

The temperature of the catalyst (catalyst temperature estimated value) becomes lower than the normal threshold temperature (TH1=630° C.) at time Ts1 so that the engine 1 is operated, and the temperature of the catalyst reaches the warm-up required temperature (TD=667° C.) at time Te1 so that the engine 1 is stopped.

In Case 3, like in Case 1, even though the manner mode is selected at time T0, since the engine 1 is operated immediately thereafter at time Ts2, a sense of incongruity is given to the driver. Further, even though the manner mode is selected at time T0 and the manner mode is continued thereafter, since the engine 1 is operated at time Ts2 and time Ts3, a sense of incongruity is given to the driver.

On the other hand, as illustrated in FIG. 11, in the case where the catalyst warm-up control of this embodiment is applied, when the manner mode is selected at time T0, like in Case 1 and Case 2, regardless of the normal threshold temperature (TH1) and a manner mode threshold temperature (TH2), the catalyst warm-up control is prohibited until the temperature of the catalyst is lowered from the temperature of the catalyst at the time of the selection of the manner mode by a predetermined temperature (ΔT=20° C.).

On the other hand, the threshold temperature for determining whether or not to perform the catalyst warm-up control is switched from the normal threshold temperature (TH1=630° C.) to the manner mode threshold temperature (TH2=550° C.) at time T0. Consequently, since the temperature of the catalyst at which the catalyst warm-up control is allowed is kept to be higher than the manner mode threshold temperature (TH2), the engine 1 is not operated. Then, when the temperature of the catalyst becomes lower than the manner mode threshold temperature (TH2) at time Ts2, the engine 1 is operated.

In Case 3, since the manner mode threshold temperature (TH2=550° C.) is set to be lower than the normal threshold temperature (TH1=630° C.), the stop period (Ts2-T0) of the engine 1 after the selection of the manner mode can be made longer than a time (e.g. 1 minute) during which the temperature of the catalyst is lowered by ΔT, and therefore, a sense of incongruity is not given to the driver. In this embodiment, at least a time (about 4 minutes) during which the temperature of the catalyst is lowered from 630° C. to 550° C. can be used as the stop period of the engine 1. Like in Case 1 and Case 2, even when the manner mode is released with the operation of the engine 1 (the start of the catalyst warm-up control), a sense of incongruity is not given to the driver.

[Effects of this Embodiment]

A catalyst warm-up control method for a hybrid vehicle according to this embodiment is applied to the hybrid vehicle configured to supply electric power to an electric motor 4 by a battery 3, to charge the battery by a power generation engine 1, and to treat exhaust gas discharged from the engine 1 with a catalyst, the hybrid vehicle capable of selecting a manner mode in which power generation using the engine 1 is stopped. The catalyst warm-up control method performs catalyst warm-up control such that when the temperature of the catalyst becomes lower than a normal threshold temperature (threshold temperature) for activating the catalyst, the target rotation speed of the engine 1 is controlled to a first warm-up required rotation speed at which the catalyst can be heated to a warm-up required temperature (temperature) that is higher than the normal threshold temperature (threshold temperature). When the manner mode is selected, the catalyst warm-up control is performed when the temperature of the catalyst becomes lower than a manner mode threshold temperature that is equal to or less than the normal threshold temperature (threshold temperature).

A catalyst warm-up control apparatus (vehicle controller 9) for a hybrid vehicle that realizes the above-described method is applied to the hybrid vehicle including the battery 3 for supplying electric power to the electric motor 4, the power generation engine 1 for charging the battery 3, and the catalyst (not illustrated) for treating exhaust gas discharged from the engine 1, the hybrid vehicle capable of selecting the manner mode in which power generation using the engine 1 is stopped. The catalyst warm-up control apparatus (vehicle controller 9) includes the catalyst warm-up command unit 92 configured to transmit a catalyst warm-up command signal when the temperature of the catalyst becomes lower than a threshold temperature for activating the catalyst, and the engine control unit 93 configured to, when the catalyst warm-up command signal is received, perform catalyst warm-up control by controlling the target rotation speed of the engine 1 to a first warm-up required rotation speed at which the catalyst can be heated to a warm-up required temperature (temperature) that is higher than the normal threshold temperature (threshold temperature). When the manner mode is selected, the catalyst warm-up command unit 92 transmits the catalyst warm-up command signal when the temperature of the catalyst becomes lower than a manner mode threshold temperature that is equal to or less than the threshold temperature.

With the above-described method and the above-described configuration, the stop period of the engine 1 (e.g. 4 minutes) from the selection of the manner mode to the start of the catalyst warm-up control can be surely obtained, and therefore, a sense of incongruity is not given to the driver.

In this embodiment, the catalyst warm-up control is prohibited until the temperature of the catalyst is lowered from the temperature of the catalyst at the time of the selection of the manner mode by a predetermined temperature (ΔT=e.g. 20° C.). Specifically, the catalyst warm-up command unit 92 determines that the catalyst warm-up command signal cannot be transmitted until the temperature of the catalyst is lowered from the temperature of the catalyst at the time of the selection of the manner mode by the predetermined temperature (ΔT).

Consequently, regardless of the threshold temperatures (the normal threshold temperature (TH1) and the manner mode threshold temperature (TH2)), the catalyst warm-up control is prohibited until the temperature of the catalyst is lowered from the temperature of the catalyst at the time of the selection of the manner mode by the predetermined temperature (ΔT=20° C.). Therefore, the stop period (Ts2-T0) of the engine 1 from the selection of the manner mode (time T0) to the start of the catalyst warm-up control (time Ts2) can be ensured by a time (e.g. 1 minute) during which the temperature of the catalyst is lowered by ΔT, and therefore, a sense of incongruity is not given to the driver.

In this embodiment, when the catalyst warm-up control is performed after the selection of the manner mode, the target rotation speed of the engine 1 is controlled to a second warm-up required rotation speed (e.g. 1300 rpm) lower than the first warm-up required rotation speed (e.g. 2000 rpm) as the initial state, and controlled to the first warm-up required rotation speed after a predetermined time. Specifically, when performing the catalyst warm-up control after the selection of the manner mode, the engine control unit 93 controls the target rotation speed to the second warm-up required rotation speed lower than the first warm-up required rotation speed as the initial state, and controls the target rotation speed to the first warm-up required rotation speed after the predetermined time. Consequently, it is possible to suppress an increase in the amount of untreated gas discharged at the time of the start of the catalyst warm-up control.

In this embodiment, the normal threshold temperature (threshold temperature), the manner mode threshold temperature, and the first warm-up required rotation speed are set based on the vehicle speed. Specifically, the normal threshold temperature (threshold temperature), the manner mode threshold temperature, and the first warm-up required rotation speed are set based on the vehicle speed by, for example, the catalyst warm-up command unit 92. Consequently, it is possible to perform the minimum required catalyst warm-up control according to the vehicle speed.

In this embodiment, the manner mode is released when the catalyst warm-up control is performed after the selection of the manner mode. Specifically, the catalyst warm-up control apparatus (vehicle controller 9 (ECU 91)) releases the manner mode when the catalyst warm-up control is performed after the selection of the manner mode. By the catalyst warm-up control method (catalyst warm-up control apparatus) of this embodiment, the stop period (1 minute or 4 minutes) of the engine 1 from the selection of the manner mode to the start of the catalyst warm-up control is ensured. Therefore, even when the manner mode is released at the time of the start of the catalyst warm-up control, a sense of incongruity is not given to the driver.

While the embodiment of the present invention has been described above, the above-described embodiment only shows part of application examples of the present invention and is not intended to limit the technical scope of the present invention to the specific configurations of the above-described embodiment.

The invention claimed is:

1. A catalyst warm-up control method for a hybrid vehicle configured to supply electric power to an electric motor by a battery, to charge the battery by a power generation engine, and to treat exhaust gas discharged from the engine with a catalyst, the hybrid vehicle capable of selecting a manner mode in which power generation using the engine is stopped, wherein:

catalyst warm-up control is performed such that when a temperature of the catalyst becomes lower than a threshold temperature for activating the catalyst, a target rotation speed of the engine is controlled to a first warm-up required rotation speed at which the catalyst can be heated to a temperature higher than the threshold temperature;

when the manner mode is selected, the catalyst warm-up control is performed when the temperature of the catalyst becomes lower than a manner mode threshold temperature that is equal to or less than the threshold temperature, and the catalyst warm-up control is prohibited until the temperature of the catalyst is lowered from a catalyst temperature at a time of a selection of the manner mode by a predetermined temperature; and when a difference obtained by subtracting the manner mode threshold temperature from the catalyst temperature at the time of the selection of the manner mode is lower than the predetermined temperature, the catalyst warm-up control is prohibited until the temperature of the catalyst is lowered from the catalyst temperature at the time of the selection of the manner mode by the predetermined temperature.

2. The catalyst warm-up control method for the hybrid vehicle according to claim 1, wherein when the catalyst warm-up control is performed after selection of the manner mode, the target rotation speed of the engine is controlled to a second warm-up required rotation speed lower than the first warm-up required rotation speed as an initial state, and controlled to the first warm-up required rotation speed after a predetermined time.

3. The catalyst warm-up control method for the hybrid vehicle according to claim 1, wherein the threshold temperature, the manner mode threshold temperature, and the first warm-up required rotation speed are set based on a vehicle speed.

4. The catalyst warm-up control method for the hybrid vehicle according to claim 1, wherein the manner mode is released when the catalyst warm-up control is performed after selection of the manner mode.

5. A catalyst warm-up control apparatus for a hybrid vehicle including:

a battery for supplying electric power to an electric motor;
a power generation engine for charging the battery; and
a catalyst for treating exhaust gas discharged from the engine, the hybrid vehicle capable of selecting a manner mode in which power generation using the engine is stopped, the catalyst warm-up control apparatus comprising:

a catalyst warm-up command unit configured to transmit a catalyst warm-up command signal when a temperature of the catalyst becomes lower than a threshold temperature for activating the catalyst; and an engine control unit configured to, when the catalyst warm-up command signal is received, perform catalyst warm-up control by controlling a target rotation speed of the engine to a first warm-up required rotation speed at which the catalyst can be heated to a temperature higher than the threshold temperature, wherein the catalyst warm-up command unit is configured to:

when the manner mode is selected, transmit the catalyst warm-up command signal when the temperature of the catalyst becomes lower than a manner mode threshold temperature that is equal to or less than the threshold temperature;

determine that the catalyst warm-up command signal cannot be transmitted until the temperature of the catalyst is lowered from a catalyst temperature at a time of a selection of the manner mode by a predetermined temperature; and when a difference obtained by subtracting the manner mode threshold temperature from the catalyst temperature at the time of the selection of the manner mode is lower than the predetermined temperature, determine that the catalyst warm-up command signal cannot be transmitted until the temperature of the catalyst is lowered from the catalyst temperature at the time of the selection of the manner mode by the predetermined temperature.

6. The catalyst warm-up control apparatus for the hybrid vehicle according to claim 5, wherein the engine control unit is configured to, when performing the catalyst warm-up control after selection of the manner mode, control the target rotation speed to a second warm-up required rotation speed lower than the first warm-up required rotation speed as an initial state, and control the target rotation speed to the first warm-up required rotation speed after a predetermined time.

7. The catalyst warm-up control apparatus for the hybrid vehicle according to claim 5, wherein the threshold temperature, the manner mode threshold temperature, and the first warm-up required rotation speed are set based on a vehicle speed.

8. The catalyst warm-up control apparatus for the hybrid vehicle according to claim 5, wherein the manner mode is released when the catalyst warm-up control is performed after selection of the manner mode.

* * * * *